March 13, 1934.　　　　R. B. WASSON　　　　1,950,532
PORTABLE PRESSURE GAUGE
Filed Nov. 20, 1925
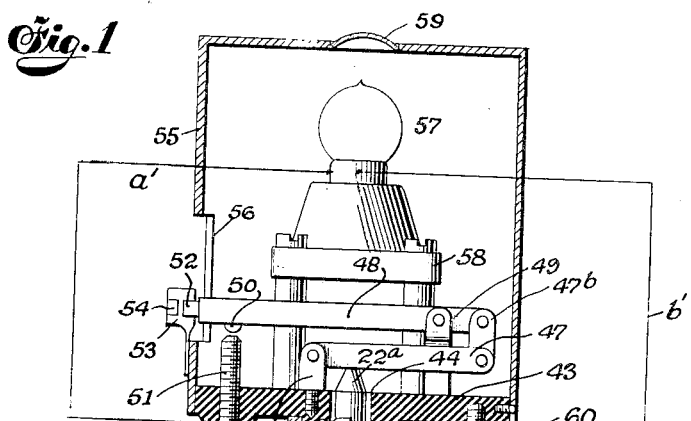
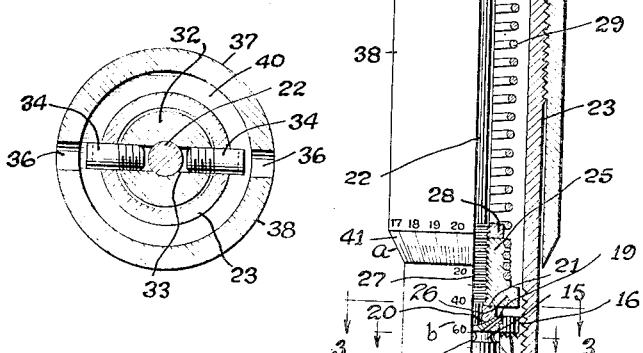
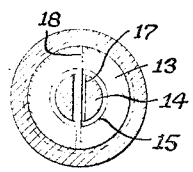
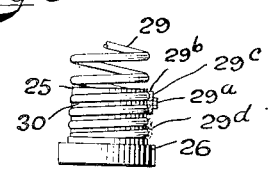
INVENTOR,
Robert B. Wasson.
BY
Ramsay Hoguet
ATTORNEY Patented Mar. 13, 1934

1,950,532

UNITED STATES PATENT OFFICE 1,950,532

PORTABLE PRESSURE GAUGE

Robert B. Wasson, Cranford, N. J.

Application November 20, 1925, Serial No. 70,423

2 Claims. (Cl. 73—111)

My invention relates to improvements in portable impulse pressure gauges of the type illustrated in the British patent to Okill No. 12,158 of 1907, and the United States Patent No. 1,467,558, dated September 11th, 1923. This type of pressure gauge is particularly useful in measuring the pressures of the cylinders of internal combustion engines under service conditions, although the device may be used for determining other pressures. In the structure a cylinder is used which is connected with a pressure to be determined, and in the cylinder is a piston backed by a pressure spring adjusted by calibrated means for regulating its pressure and indicating the same.

The object of my invention is to simplify, cheapen, and render more efficient a gauge of this type. Such pressure gauges as heretofore made have been rather expensive, the visual means of indicating when the pressures on the two sides of the piston approach equilibrium have been awkward and impossible to follow, and in the later development of the invention referred to in the United States patent mentioned above, the counting arrangement is also inconvenient and adds to the expense of the machine. My invention is intended to produce a simpler and more efficient structure of this type, having a simple adjusting means and indicator, and having a visual or audible signal which is sensitive to slight pressure variations, which can be readily detected to make the adjustment of the device simpler, quicker and more accurate. In structures of this kind, a spring is used, the pressure or tension and rate of deflection of which has heretofore had to be very accurately established, and this is an expense; but in my improvement I employ means for using a spring which need not be so accurately fabricated, as the instrument itself has means for regulating the effective length of the spring and therefore adjusting it to the calibrating tables of the device. In my improvement too, I prefer to make the visual signal electric and responsive to slight variations of the piston, and this also tends to very easy and accurate adjustment of the parts as will appear from the description which follows.

Reference is to be had to the accompanying drawing forming a part of this specification, in which similar reference characters indicate corresponding parts in all the views.

Figure 1 is a longitudinal view partly broken of my structure;

Figure 2 is a cross section on the line 2—2 of Figure 1;

Figure 3 is a cross section on the line 3—3 of Figure 1;

Figure 4 is a cross section on the line 4—4 of Figure 1;

Figure 5 is a detail of the means for regulating the effective length of the pressure spring;

Figure 6 is a plan of the piston cylinder; and

Figure 7 is a broken detail of a preferred yielding connection between the piston rod and a part of the signal mechanism.

The device has at the lower end a member 10, the sides of which are faceted as shown at 11 so that a wrench can be easily applied, and the lower end is formed into a nipple 12 which can be screwed into an opening of an engine cylinder or other part in which the pressure to be measured obtains, while the upper part of the member 10 is formed into a cylinder 13 in which moves a piston 14 having external grooves 15 which establish labyrinth packing, prevent high pressures from leaking past the piston, cup the oil and promote proper lubrication.

The piston has a very limited movement in the cylinder, and instead of using internal abutments on the main casing of the device, which have a tendency to complicate and make the structure expensive, I limit the piston movement by producing a slot 17 transversely through the piston (see Figure 4) and extending the pin 18 through the slot and into the adjacent part of the casing 13. The piston is also preferably provided with an abutment flange 16 which may rest on the top of the member 13, and an oil duct 19 extends downward through the piston, connecting with the grooves 15, so that oil within the enclosing casing presently referred to may flow to the piston wall for lubrication, oil may be placed in the casing through the slots 35 therein hereinafter described.

Means is provided for preventing an oil lock between the flange 16 and the top of the cylinder 13 which, in the example shown, is the roughened or serrated upper surface 16ª of the cylinder 13. This roughened surface divides the globules of oil and prevents a continuous cohering film from forming between said parts. Were such a film permitted it would require considerable energy to break it and the efficiency of the machine would be thereby impaired.

In the upper part of the piston, or more particularly the part 16 thereof, is a concave seat 20 in which the convex abutment 21 fits, this abutment connecting with the lower end of the piston rod 22 which extends upward through the enclosing casing 23, and the parts 20 and 21 provide for a rocking connection with the piston to prevent any binding.

It will be noticed that the casing 23 is a simple tubular casing, free from any internal interruption, and it is connected to the member 10 by screw threads as shown at 24. Riding on the abutment 21 is a member 25 having a flanged lower portion 26 although the flange is not really necessary, and the piston rod 22 screws into this member 25 as clearly shown in Figure 1, while the connection is made permanent by a lock nut 28, and by the means described the position of the member 25 on the piston rod and the compression of the spring 29 may be nicely adjusted.

The pressure spring 29 which is arranged behind the piston 14 is backed by an abutment presently referred to, and the lower end of the spring screws to a thread 30 on the member 25, which thread should be of substantially the same pitch and contour as that of the helical spring 29. Thus it will be seen that by turning the spring more or less upon the member 25, the effective length of the spring, and therefore its characteristic pressure and rate of deflection may be fixed or adjusted, that is to say if the spring is screwed far upon the member 25, the part on the said member will be dead so far as its spring action is concerned, and the spring will be shortened; but by screwing the spring to a less extent, the effective length will be increased, and thus if the spring is not originally made of the exact characteristic required, this discrepancy can be remedied by adjusting its effective length until it is of the right characteristic and corresponds accurately with the calibrating tables presently referred to.

This adjustment of the spring is made at the time the instrument is assembled, and may thereafter be adjusted to compensate for any changes of the spring characteristics in use and the adjustment whenever effected can be made permanent in any suitable way. For example, a pin 29ª can project from the member 25 between two coils of the spring; the pin can carry a bridge 29ᵇ which will clamp upon the adjacent coils and the bridge can be held in place by a nut 29ᶜ threaded to the pin. If desired a lead or other seal 29ᵈ may be placed over certain of the coils on the member 25 and marked by the manufacturer of the instrument, so that if the seal is afterwards broken it will show that the instrument has been tampered with. The instrument can be taken apart easily by unscrewing the connection 10, and if the spring 29 needs recalibrating or adjusting, it can be taken out, the seal broken, and the spring readjusted.

The upper end of the pressure spring 29 extends around the reduced part 31 of a movable abutment 32, and the spring cooperates with the abutment, so that if the abutment is moved lengthwise, it effects the pressure of the spring upon the piston 14. The abutment 32 is pierced to permit the piston rod 22 to pass through it, and also is bored transversely as shown at 33 in Figures 1 and 2 to receive screw studs 34 which move longitudinally in the slots 35 of the casing 23, and which also may be made to register with holes 36 in the milled part 37 of the sleeve 38 when assembling the device. The sleeve 38 is mounted on the casing 23 and connects therewith by screw threads 39, so that the sleeve when turned can rotate on the casing, but also move longitudinally thereof. The arrangement of the sleeve is similar to that in the prior patents mentioned so far as its relation to the casing is concerned, but its connection with the spring is entirely different as the drawing shows.

The screw studs 34 lie normally in the circumferential groove or recess 40 on the inner part of the sleeve and opposite the milled portion 37, and when the sleeve is turned, it will normally ride on the screw studs and through them act to move the abutment 32 with relation to the spring 29 so as to regulate its pressure.

The sleeve 38 is tapered at the lower and upper ends as shown at 41 and 42, these parts being gauged circumferentially and marked in a well known manner to make the circumferential tables "a" which are read in connection with the axial table "b" on the casing. This is gauged to indicate pounds pressure per square inch, the two tables being read in the ordinary manner of micrometer readings. The upper and lower tables "a" are reversely arranged, however, so that the indicated pressure can be read from either side and in the drawing part of the upper table "b" is hidden by the sleeve 38.

At the upper end the casing 23 abuts with a plate 43 which is preferably of electrically insulating material and is bored as shown at 44 to permit the piston rod 22 to pass through it. A reduced part 45 on the under side of the plate enters the casing 23 and is attached thereto in any convenient way, as for instance by a screw 46.

The upper end of the piston rod 22 is preferably reduced as shown at 22a, and is made to actuate an indicating device which is preferably an electric one, such as a light or by audible means, as by earphones. As a means of making the signal effective and responsive to the very slight and often very rapid movements of the piston and piston rod, it is necessary to use some means of amplifying such movements. I have shown an effective way, and as illustrated the upper end of the piston rod abuts with a lever 47 which is pivoted on the bracket 47a attached to the plate 43, and the free end of which connects by a link 47b with the short end of the beam or lever 48 which is fulcrumed on a supporting bracket 49, and has near its free end a contact 50 adapted to contact with a contact or binding screw 51, this being the means of making and breaking the lamp circuit presently referred to. At the free end of the beam 48 is also a member 52 moving over the plate 53 which is suitably supported, and which carries a member 54, this being spaced from the member 52, and the members 52 and 54 as well as the plate 53 may be of contrasting colors, so that if the beam 48 moves, the movement can be readily observed on the plate 53.

The indicating part of the devices is preferably, and for protective reasons, included in the casing 55 which is slotted as shown at 56 to permit the beam 48 to pass through it, and in which is included an electric lamp 57 mounted on a suitable support 58 which serves as a ground connection if need be. Above the lamp is a bullseye 59 through which the light can be readily seen.

The means for making and breaking the circuit through the lamp by means of the contacts 50 and 51 can be any ordinary means. I have shown the binding contact post 51 as the point where the current can be let in, and the circuit a' includes the external socket circuit of the lamp, and the ground connection of one of the filament ends. The other part of the circuit is through the wire b', the binding post 60, the battery "B" to the ground. I have not shown the details of the connection because these are so common that they are well understood, and the only thing necessary is to have the circuit made and broken by the movement of the beam 48 or other equivalent.

This instrument, it will be noticed, is very simple, it has no extending side parts, its internal construction is free and clear of abutments and mechanism which might lead to difficulties, and the indicating apparatus is very sensitive and responsive to movements of the piston 14 as the point of equilibrium between the pressures on the two ends of the piston is reached. It will be seen that the sleeve 38 may be adjusted to a certain pressure of the spring 29, and when the pressure in front of the piston exceeds the spring pressure, the slight movement of the piston and the piston rod will through the magnifying means shown, actuate the indicating device. If the pressure in front of the piston is much in excess of the spring pressure behind it, the visual signal will remain showing and the lamp will burn steadily, but the sleeve 38 can be adjusted so as to cause the signal to operate intermittently as the point of equilibrium is reached and the pressures vary, and after a little practice the operator noticing these signals can easily adjust the sleeve 38 to the indicated pressure, which can be observed accurately by reason of the calibrating tables as usual. The movement of the piston 14 is so quick and powerful that it is advisable to introduce a yielding element between it and the signal mechanism, as for instance the spring end 22b of the piston rod 22, when the rod contacts with the lever 47 as shown in Fig. 7.

I am aware that spring pressure gauges are common for constant or incremental pressures, but my invention is peculiarly adapted for use as an impulse pressure indicator where both the pressures and speed of impulse are not only variable quantities, but quickly variable quantities. The foregoing description will make it clear that my pressure gauge is especially adapted for use in the class of cases indicated because of its sensitiveness and its quick response to sudden variations of pressure. It will also be noted that while the pressure gauge indicates pressure in pounds per square inch, the piston can be of small diameter so long as it has the correct ratio to the spring.

It will further be observed that by reason of the ease of adjustment of the spring 29 to secure both its effective length and pressure on the piston, the correct initial tension can be very easily ascertained and fixed and its rate of deflection made to correspond to the calibrating tables.

I claim:—

1. In a pressure gauge, a vertically disposed, externally threaded casing carrying pressure actuated mechanism including a piston and a helical spring opposing upward movement of said piston, a member having a screw threaded portion of a pitch substantially equal to the pitch of said spring and adapted to engage a desired length of said spring, thereby determining its effective length, a sleeve screw threaded to said casing and adapted upon rotation to move longitudinally relative to said casing, said sleeve carrying a member abutting said spring and adapted to increase or decrease the tension of said spring, said sleeve and casing carrying cooperating indicia for micrometrically showing the relative position of said abutting member to said screw-threaded member and indicating the tension of said spring.

2. In an instrument of the kind described, the combination with a casing carrying pressure actuated mechanism and having external tables axially calibrated to indicate pounds, a sleeve rotatable on the casing, and means whereby said sleeve is connected to the pressure actuated mechanism to adjust the same, said sleeve having a pair of circumferentially placed tables readable in opposite directions to each other and calibrated for micrometric reading with said axial tables.

ROBERT B. WASSON.